(12) United States Patent
Dharmaji et al.

(10) Patent No.: US 8,510,661 B2
(45) Date of Patent: Aug. 13, 2013

(54) END TO END RESPONSE ENABLING COLLECTION AND USE OF CUSTOMER VIEWING PREFERENCES STATISTICS

(75) Inventors: Srinivasa Dharmaji, Cupertino, CA (US); Xin Feng, Basking Ridge, NJ (US)

(73) Assignee: Goldspot Media, Sunnyvale, CA (US)

( * ) Notice: Subject to any disclaimer, the term of this patent is extended or adjusted under 35 U.S.C. 154(b) by 411 days.

(21) Appl. No.: 12/368,141

(22) Filed: Feb. 9, 2009

(65) Prior Publication Data

US 2009/0204901 A1 Aug. 13, 2009

Related U.S. Application Data

(60) Provisional application No. 61/065,258, filed on Feb. 11, 2008.

(51) Int. Cl.
| | |
|---|---|
| *G06F 3/00* | (2006.01) |
| *G06F 15/16* | (2006.01) |
| *G06F 15/173* | (2006.01) |
| *G06F 13/00* | (2006.01) |
| *G06Q 30/00* | (2012.01) |
| *G07G 1/12* | (2006.01) |
| *G07G 5/00* | (2006.01) |
| *H04N 7/10* | (2006.01) |
| *H04N 7/025* | (2006.01) |
| *H04N 7/173* | (2011.01) |

(52) U.S. Cl.
USPC ......... 715/745; 705/14; 705/14.4; 705/14.61; 705/14.64; 705/14.66; 705/24; 705/26; 705/26.1; 709/203; 709/219; 709/224; 709/227; 709/228; 709/230; 709/231; 725/32; 725/34; 725/35; 725/37; 725/88; 725/102; 725/109

(58) Field of Classification Search
USPC ............ 715/745; 705/14, 14.4, 14.64, 14.61, 705/14.66, 24, 26, 26.1; 725/32, 34, 35, 725/37, 88, 102, 109; 707/100; 709/203, 709/219, 224, 227, 228, 230, 231
See application file for complete search history.

(56) References Cited

U.S. PATENT DOCUMENTS

| | | | |
|---|---|---|---|
| 5,914,654 A | | 6/1999 | Smith |
| 6,067,008 A | | 5/2000 | Smith |
| 6,137,834 A | * | 10/2000 | Wine et al. ..................... 375/240 |
| 6,182,098 B1 | | 1/2001 | Selker |
| 6,317,885 B1 | | 11/2001 | Fries |
| 6,342,926 B1 | | 1/2002 | Hanafee et al. |
| 6,477,575 B1 | * | 11/2002 | Koeppel et al. ............... 709/224 |
| 6,505,169 B1 | * | 1/2003 | Bhagavath et al. ........ 705/14.66 |
| 6,519,571 B1 | * | 2/2003 | Guheen et al. ............ 705/14.66 |

(Continued)

FOREIGN PATENT DOCUMENTS

| | | | |
|---|---|---|---|
| GB | 2404751 A | * | 2/2005 |
| JP | 2005-259097 | | 9/2005 |

*Primary Examiner* — Kieu Vu
*Assistant Examiner* — Eric J Bycer
(74) *Attorney, Agent, or Firm* — Michael A. Glenn; Perkins Coie LLP (57) ABSTRACT

Targeted advertisements with associated dynamic content for response and feedback embedded into the ad's header are delivered to mobile viewing devices. The mobile viewing device records a user's response to advertisements and reports it back to an ad serving platform. The ad serving platform generates user profiles that incorporate the response data. Ads are further targeted to the user according to the user's profile data to maximize the impact of the ads. The user can select the preferred format for providing advertisement feedback.

18 Claims, 6 Drawing Sheets

(56) References Cited

U.S. PATENT DOCUMENTS

| | | | |
|---|---|---|---|
| 6,647,257 B2 | 11/2003 | Owensby | |
| 6,698,020 B1* | 2/2004 | Zigmond et al. | 725/34 |
| 6,711,552 B1 | 3/2004 | Kay | |
| 6,714,992 B1 | 3/2004 | Kanojia et al. | |
| 6,847,992 B1 | 1/2005 | Haitsuka et al. | |
| 6,915,012 B2 | 7/2005 | Osborne et al. | |
| 7,027,801 B1 | 4/2006 | Hall et al. | |
| 7,062,469 B2 | 6/2006 | Meyers et al. | |
| 7,271,737 B1 | 9/2007 | Hoffberg | |
| 7,343,317 B2 | 3/2008 | Jokinen et al. | |
| 7,505,920 B2 | 3/2009 | Agarwal et al. | |
| 7,516,201 B2 | 4/2009 | Kovacs et al. | |
| 7,533,343 B2 | 5/2009 | Ratnakar | |
| 7,613,691 B2 | 11/2009 | Finch | |
| 7,647,316 B2 | 1/2010 | Patel et al. | |
| 7,650,617 B2 | 1/2010 | Hoshino et al. | |
| 7,684,790 B2 | 3/2010 | Cartmell | |
| 7,720,835 B2 | 5/2010 | Ward et al. | |
| 7,724,783 B2 | 5/2010 | Shvodian et al. | |
| 7,747,264 B2 | 6/2010 | Fiorini | |
| 7,769,633 B2 | 8/2010 | Jokinen et al. | |
| 7,775,440 B2 | 8/2010 | Silverbrook et al. | |
| 7,778,636 B2 | 8/2010 | Rolf | |
| 7,805,444 B2 | 9/2010 | Roche et al. | |
| 7,856,372 B2 | 12/2010 | Ullah | |
| 7,856,373 B2 | 12/2010 | Ullah | |
| 7,861,260 B2 | 12/2010 | Shkedi | |
| 8,009,608 B2 | 8/2011 | Karaoguz et al. | |
| 8,132,202 B2* | 3/2012 | Swix et al. | 725/34 |
| 2001/0023436 A1* | 9/2001 | Srinivasan et al. | 709/219 |
| 2001/0034654 A1 | 10/2001 | Vigil et al. | |
| 2001/0056405 A1* | 12/2001 | Muyres et al. | 705/52 |
| 2002/0046099 A1* | 4/2002 | Frengut et al. | 705/14 |
| 2002/0055968 A1* | 5/2002 | Wishoff et al. | 709/203 |
| 2002/0083445 A1* | 6/2002 | Flickinger et al. | 725/35 |
| 2002/0087397 A1* | 7/2002 | Mazza | 705/14 |
| 2002/0087976 A1* | 7/2002 | Kaplan et al. | 725/34 |
| 2002/0133405 A1* | 9/2002 | Newnam et al. | 705/14 |
| 2002/0154163 A1 | 10/2002 | Melchner | |
| 2002/0166119 A1* | 11/2002 | Cristofalo | 725/34 |
| 2003/0004802 A1* | 1/2003 | Callegari | 705/14 |
| 2003/0028889 A1* | 2/2003 | McCoskey et al. | 725/91 |
| 2003/0131070 A1* | 7/2003 | Stroebel et al. | 709/217 |
| 2003/0137544 A1* | 7/2003 | Mears et al. | 345/810 |
| 2003/0151621 A1* | 8/2003 | McEvilly et al. | 345/744 |
| 2003/0188308 A1* | 10/2003 | Kizuka | 725/32 |
| 2004/0003118 A1* | 1/2004 | Brown et al. | 709/246 |
| 2004/0073947 A1* | 4/2004 | Gupta | 725/134 |
| 2004/0103120 A1 | 5/2004 | Fickle et al. | |
| 2004/0133480 A1* | 7/2004 | Domes | 705/26 |
| 2005/0044082 A1* | 2/2005 | Chande et al. | 707/10 |
| 2005/0149385 A1 | 7/2005 | Trively | |
| 2005/0197164 A1 | 9/2005 | Chan | |
| 2006/0020548 A1 | 1/2006 | Flather et al. | |
| 2006/0036488 A1* | 2/2006 | Golan et al. | 705/14 |
| 2006/0074769 A1 | 4/2006 | Looney et al. | |
| 2006/0136297 A1 | 6/2006 | Willis et al. | |
| 2006/0168664 A1* | 7/2006 | Frank et al. | 726/27 |
| 2006/0259455 A1* | 11/2006 | Anderson et al. | 707/1 |
| 2006/0294538 A1 | 12/2006 | Li et al. | |
| 2007/0047002 A1 | 3/2007 | Hull et al. | |
| 2007/0061204 A1 | 3/2007 | Ellis et al. | |
| 2007/0061205 A1 | 3/2007 | Crolley | |
| 2007/0078712 A1 | 4/2007 | Ott, IV et al. | |
| 2007/0088801 A1* | 4/2007 | Levkovitz et al. | 709/217 |
| 2007/0094082 A1* | 4/2007 | Yruski et al. | 705/14 |
| 2007/0101359 A1* | 5/2007 | Schiller et al. | 725/33 |
| 2007/0146200 A1 | 6/2007 | Norin et al. | |
| 2007/0198339 A1 | 8/2007 | Shen et al. | |
| 2007/0204310 A1* | 8/2007 | Hua et al. | 725/88 |
| 2008/0004957 A1* | 1/2008 | Hildreth et al. | 705/14 |
| 2008/0040743 A1 | 2/2008 | Dharmaji et al. | |
| 2008/0040768 A1 | 2/2008 | Robotham | |
| 2008/0081640 A1 | 4/2008 | Tran et al. | |
| 2008/0103875 A1* | 5/2008 | Kokernak et al. | 705/10 |
| 2008/0114762 A1 | 5/2008 | Fukuda et al. | |
| 2008/0182563 A1 | 7/2008 | Wugofski et al. | |
| 2008/0189735 A1* | 8/2008 | Barton et al. | 725/32 |
| 2008/0195468 A1* | 8/2008 | Malik | 705/14 |
| 2008/0201734 A1 | 8/2008 | Lyon et al. | |
| 2008/0255943 A1 | 10/2008 | Morten et al. | |
| 2008/0270886 A1 | 10/2008 | Gossweiler et al. | |
| 2008/0288354 A1 | 11/2008 | Flinn et al. | |
| 2008/0290987 A1* | 11/2008 | Li | 340/5.1 |
| 2008/0313029 A1* | 12/2008 | Evans | 705/14 |
| 2008/0318559 A1 | 12/2008 | Porco | |
| 2009/0106126 A1 | 4/2009 | Asano et al. | |
| 2009/0171779 A1 | 7/2009 | Shrivathsan et al. | |
| 2009/0197582 A1 | 8/2009 | Lewis et al. | |
| 2010/0002874 A1 | 1/2010 | Obayashi et al. | |
| 2010/0017280 A1 | 1/2010 | Davis et al. | |
| 2010/0041422 A1 | 2/2010 | Wormald et al. | |
| 2010/0042485 A1 | 2/2010 | Wang et al. | |
| 2010/0082435 A1 | 4/2010 | Hartman | |
| 2010/0131365 A1 | 5/2010 | Subramanian et al. | |
| 2010/0138295 A1 | 6/2010 | Caron et al. | |
| 2010/0205049 A1 | 8/2010 | Long et al. | |
| 2010/0228611 A1 | 9/2010 | Shenfield | |
| 2010/0235891 A1 | 9/2010 | Oglesbee et al. | |
| 2010/0250351 A1 | 9/2010 | Gillenson et al. | |
| 2010/0250368 A1 | 9/2010 | Porco | |
| 2010/0274661 A1 | 10/2010 | Aaltonen et al. | |
| 2010/0274673 A1 | 10/2010 | Isaac | |
| 2011/0029363 A1 | 2/2011 | Gillenson et al. | |
| 2011/0040627 A1 | 2/2011 | Brewer et al. | |
| 2011/0178875 A1 | 7/2011 | Dharmaji | |
| 2011/0184790 A1 | 7/2011 | Deol et al. | |
| 2011/0184810 A1 | 7/2011 | Dharmaji | |

\* cited by examiner

END TO END RESPONSE ENABLING COLLECTION AND USE OF CUSTOMER VIEWING PREFERENCES STATISTICS

CROSS REFERENCE TO RELATED APPLICATIONS

This patent application claims the benefit of U.S. provisional patent application Ser. No. 61/065,258, End-to-End Response Enabling Collection and Use of Customer Viewing Preference Statistics, filed Feb. 11, 2008, the entirety of each of which are incorporated herein by this reference thereto.

BACKGROUND OF THE INVENTION

1. Technical Field

The invention relates generally relates to advertisements delivered to mobile wireless viewing devices. More specifically, the invention relates to the delivery of targeted advertisements to mobile wireless video viewing devices with the capability for client specific responses including feedback to the advertisements.

2. Description of the Related Art

Advertisements, i.e., "ads," are typically distributed to mobile wireless video viewing devices, i.e., "mobile viewers," using multi-cast delivery. As a result, the same advertisement is received by multiple mobile viewers. Such delivery systems preclude sending targeted advertisements to each customer or group of customers.

Multi-cast systems also preclude customer responses to ads. The ability to record a user's response to an ad is helpful for measuring the ad's impact. Even if user response was measurable, however, there is little value in measuring the user's response to ads that are distributed uniformly to customers. In such scenarios, the advertiser is already aware that the ads are not targeted, and without being able to target the ads to individual users, user feedback is irrelevant.

SUMMARY OF THE INVENTION

In one embodiment, the invention comprises a system and method for distributing targeted advertisements to customers or groups of customers. A mobile viewer downloads targeted advertisements that a micro-splicer inserts into a content stream for viewing. The mobile device tracks the user response to the advertisement and transmits the response to an ad serving platform. The ad serving platform collects the responses from all user devices and uses the data to generate targeted advertisements.

DETAILED DESCRIPTION OF THE INVENTION

In one embodiment of the present invention, a method and/or an apparatus delivers targeted advertisements to mobile wireless video viewing devices with targeted advertisements and associated dynamic content for generating feedback. This end-to-end response consolidates viewers' responses to advertisements and reports them back to an ad serving platform. The feedback enables collection and use of customer responses to generating viewing preference statistics. The statistics are used to refine the advertisement generation process for maximum impact. In another embodiment of the present invention, a user interface allows users to specify a preferred interaction format for responding to advertisements.

In order to provide a real-time response capability to ads or other alternate content inserted into a video content stream, in one embodiment, the system records the dynamic aspects of a user's response, e.g., the user's location in addition to the static message content specified by the advertisement. In one embodiment, the dynamic content is specific and focused to each target group. Factors for target groups include, for example, location and preferred interest and response mode method, e.g. short message service (SMS), keyboard, email, call-back, etc.

By generating and focusing the dynamic and static content of an ad or alternate content to a target group, and providing the customer with a preferred interaction mode, it is possible to improve the ad's impact on the user. This results in increased interaction in the form of response and feedback from the user to the ad. Such an end-to-end interaction in the form of feedback is of great value to any ad campaign enabling the optimization of the impact of current and future ad campaigns.

In a system that allows the generation and download of a specific set of focused advertisements or alternate content into a mobile device, it is possible to generate advertisements that contain dynamic content that is specific to the user and static content that is the message of the campaign. The downloaded ad or alternate content is inserted into predefined advertisement spots that are identified by addressable metadata information downloaded or contained in the viewing content stream. When the alternate content is rendered, it is shown with the two parts: the static part that is the message of the ad campaign and the dynamic content that is specific to a customer or group of targeted customers. The dynamic component includes local information content that supports the ad campaign and customer specific response mode to use for responding to the content of the ad.

Once the customer responds to the information presented, the response is transferred out through a wireless channel if available, or stored and transferred with some delay through any alternate channels available to the user. The response can be separated into two segments: one directly relating to the impact of the ad campaign and the other relating to the local added content. The collected information is used to provide statistics about the interest level and viewing impact of the message contained in the ad or alternate content.

Figure 1A:
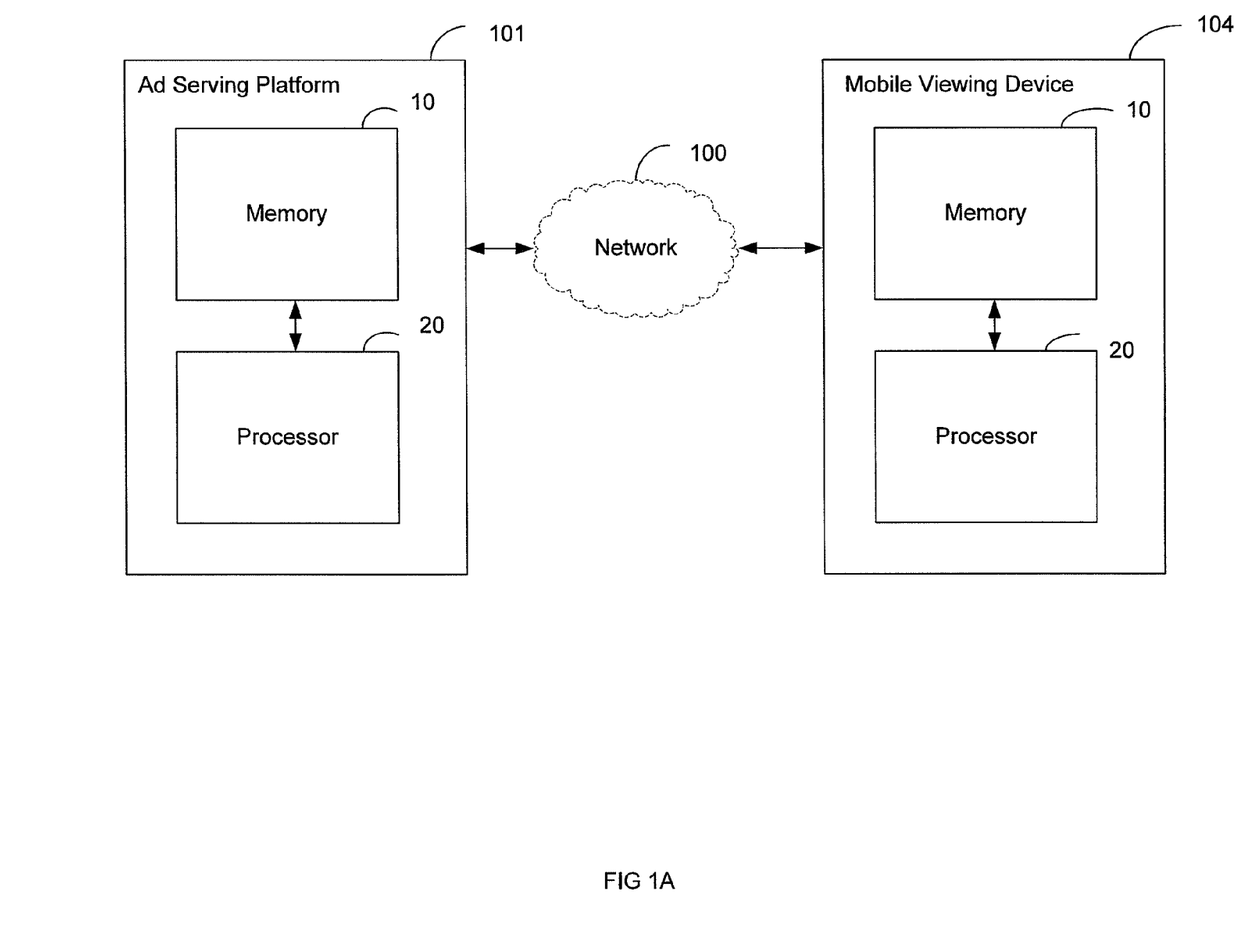
FIG. 1A is a block diagram of an ad-serving platform and a mobile viewing device according to one embodiment of the invention.

FIG. 1A is a block diagram that illustrates system hardware for running an ad serving platform 101 that interacts with a mobile viewer 104 according to one embodiment of the invention. The ad serving platform 101 is a computing platform that is configured to act as a server. The ad serving platform 101 communicates with mobile viewers 104 via a network 100. The network 100 can comprise any mechanism for the transmission of data, e.g., cable, internet, web, wireless, 3G network, etc. The mobile viewing device 104 is a computing platform that is configured to act as a client device, e.g., a personal digital assistant, a laptop, a digital media player, a cellular telephone, etc.

The ad serving platform 101 and mobile viewing devices 104 include a computer-readable memory 10, e.g., random access memory, flash memory, read only memory, etc. communicatively coupled to a processor 20. The processor 20 executes computer-executable program code stored in memory 10. Other embodiments of a computer-readable memory 10 include, but are not limited to, an electronic, optical, magnetic, or other storage device capable of communicatively coupling to a processor, e.g., CD-ROM, DVD, magnetic disk, etc.

The user is presented with a variety of formats for responding to an advertisement. Once the user selects a response format and responds, the information is transmitted preferably through a mobile data network. The methods used for responding by the user can be any one of: Click-to-Call, Click-to-Browse, Click-to-Jump page, Click-to-Message, Click-to-Mail, Click-to-Bookmark, Click-to-Share, Click-to-download, etc. Therefore, each time an ad is rendered on the mobile viewing device 104, the ad is displayed such that the user can reply using the pre-selected response format.

Figure 1B:
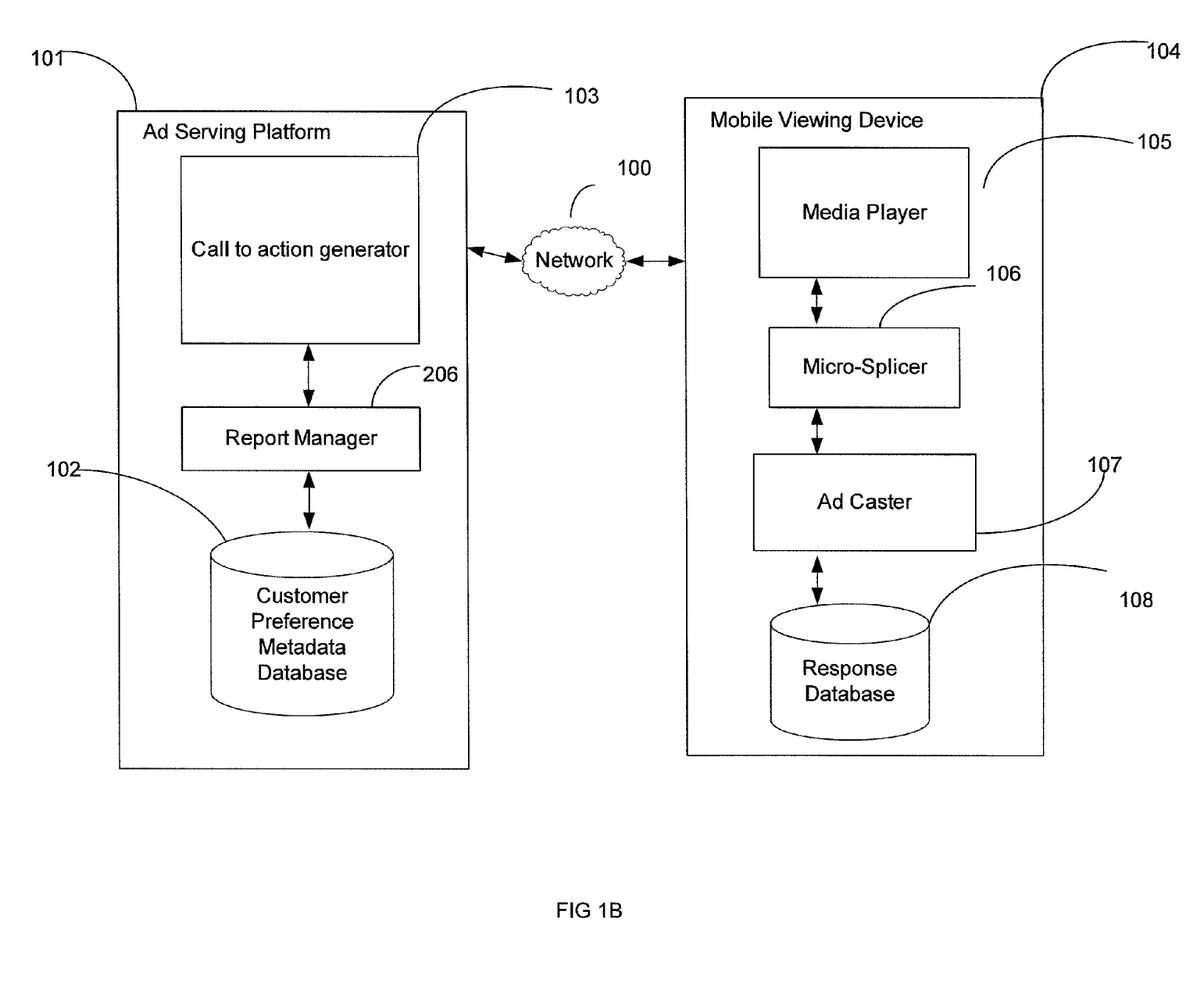
FIG. 1B is a more detailed block diagram of an ad-serving platform and a mobile viewing device according to one embodiment of the invention.

FIG. 1B is a block diagram of a system for an ad-serving platform and a mobile viewing device according to one embodiment of the invention. The end-to-end system response system comprises an advertisement serving platform 101 that interacts with mobile viewing devices 104 via a network 100.

In one embodiment, the advertisement serving platform 101 comprises a call to action generator 103, a report manager 206, and a customer preference metadata database 102. The customer preference metadata database 102 contains the client preference information including the preferred mode of response for each mobile viewing device 104. The call to action generator 103 uses the database 102 information to assign a suitable "call to action" framework to each user. A "call to action" framework includes the dynamic local content, i.e. the response mode needed for each user and user-specific information, e.g. location of the mobile viewing device 104. The call to action generator 103 embeds this information into the advertisement as a header for future extraction after the ad is downloaded by the mobile viewing device 104.

In one embodiment, the mobile viewing device 104 comprises a media player 105, a micro-splicer 106, an ad caster module 107, and a database containing response data 108. The ad caster 107 handles the transmission, scheduling, and management of the ad and a user's response to the ad. The ads are downloaded from the ad serving platform 101.

The media player 105 renders a content stream and targeted advertisements. A micro-splicer 106 inserts the advertisements into an available ad spot within the content stream. In one embodiment, the advertisements are downloaded ahead of the content stream and stored on the mobile device. In another embodiment, the advertisements are delivered along with the content stream and inserted into the content stream in real time.

Once the advertisement is rendered, the media player 105 activates the "call for action" frame based upon the ad's dynamic content. If a user responds to the advertisement, the media player 105 consolidates the response and reports it back to the ad serving platform 101 if data connectivity is available. If data connectivity is not available, the response data is stored in the memory and/or response database 108. In one embodiment, the database 108 is not static in nature, and the response data is not maintained once the mobile viewing device 104 transmits the response data to the ad serving platform 101.

Figure 2:
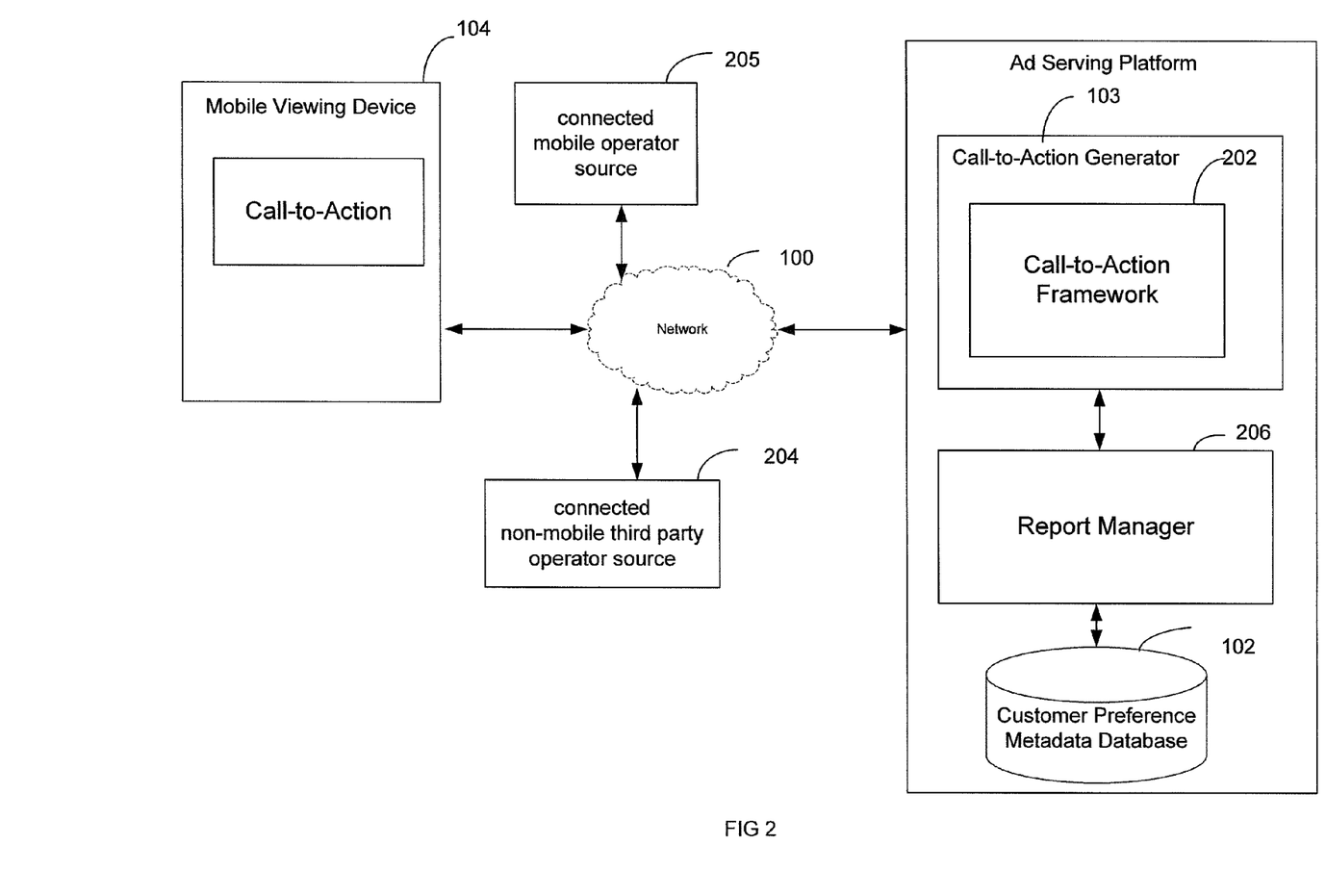
FIG. 2 is a diagram that illustrates the various sources for transmitting user responses to targeted advertisements according to one embodiment of the invention.

FIG. 2 illustrates the various sources for transmitting user responses to targeted advertisements to an ad serving platform 101 according to one embodiment of the invention. In the illustrated embodiment, the advertisement serving platform 101 receives data from three sources: directly from the viewing device 104 for a call for action, from non-mobile third-party operator sources 204, and mobile operator connected sources 205.

The ad serving platform 101 transmits a list of options to the mobile viewer 104 that allow the user to select a preference for displaying a user response interface. For example, the user can select to respond to advertisements with click-to-call, click-to-browse, click-to-jump page, click-to-message, click-to-mail, click-to-bookmark, click-to-share, and click-to-download. The customer preference is stored in the customer preference metadata database 102. If the user does not select a user preference, the ad serving platform 101 assigns a default format to the user.

The call-to-action framework 202 generates group/customer specific mechanisms for enabling user engagement to the advertisements. The mobile viewing device 104 downloads the components of the engagement chosen, depending upon client preference. The downloaded engagement format is displayed on screen as part of the dynamic response component for the user to interact with the advertisement during rendering.

Non-mobile operator third-party sources 204 can include, for example, a digital locker, which allows users to store their personal files on a remote server; email transferred using, for example, simple mail transfer protocol (SMTP); wireless communications transmitted, for example, via a wireless application protocol (WAP); and communications transmitted, for example, via a common short code (CSC) aggregator. Mobile operator connected sources 205 include, e.g. SMS and manufacturing message specification (MMS).

The ad serving platform 101 receives responses to the ads from these three sources. The report manager 206 compiles the ad responses, tracks the "call to action" component used, and generates reports that are used to update the user preferences based on the compiled information.

Figure 3:
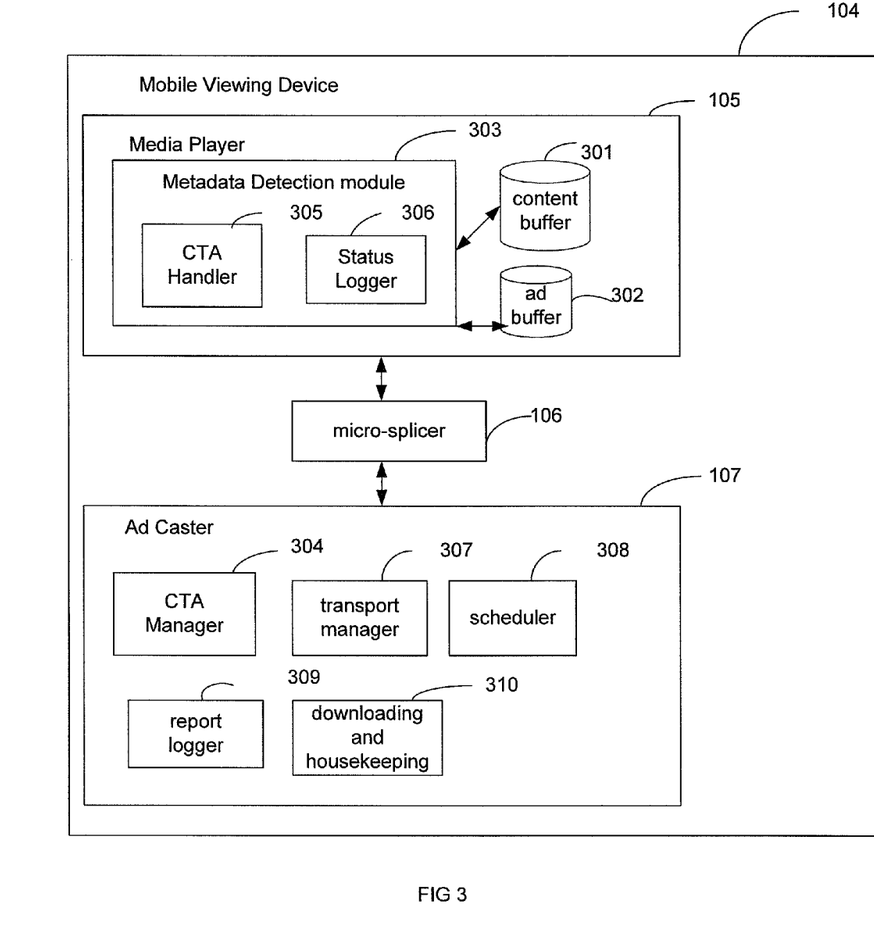
FIG. 3 is a block diagram of a media player, a micro-splicer, and an ad caster stored on a mobile viewer according to one embodiment of the invention.

FIG. 3 is block diagram 300 that illustrates the media player 105 and ad caster 107 components according to one embodiment of the invention. In one embodiment, the ad caster 107 comprises a call to action (CTA) manager 304, a transport manager 307, a scheduler 308, a report logger 309, and a downloading and housekeeping module 310.

The downloading and housekeeping module 310 manages the downloading of advertisements. The scheduler 308 manages the schedule for when a particular ad is inserted into the content stream as a function of ad spots in the content stream. The report logger 309 records ad-related activities. The transport manager 307 transmits the ad to the ad buffer 302.

The call to action manager 304 extracts instructions for displaying the information needed to record a user response to an ad, i.e., the call to action from advertisement headers, and transmits the instructions to the metadata detection module 303 located in the media player 105. The call to action manager 304 performs additional actions as desired based on the instructions. Once a user responds to an advertisement, the actions and responses are received by the call to action manager 304, which transmits the information to the advertisement serving platform 101 via available communication links.

In one embodiment, the media player 105 comprises a metadata detection module 303 that extracts program identification information from advertisement headers and scans cue tones in the content stream for metadata. Metadata includes an addressable spot guide, which contains instructions for inserting the advertisement into an ad spot in the content stream. The metadata detection module 303 transmits this information to the micro-splicer 106.

Based on the information received from the metadata detection module 303, the micro-splicer 106 redirects the rendering from the content buffer 301 to the advertisement buffer 302 for the period of the advertisement spot. As a result, the media player 105 renders the advertisement at the correct advertisement spot in the content flow.

The metadata detection module 303 also tracks user responses to the inserted ad using a call to action (CTA) handler 305 and a status logger 306. The call to action handler 305 manages the user interactions with the advertisement and the response events recorded. The status logger 306 maintains records of advertisements inserted and interruptions made by a user with respect to advertisements.

Figure 4:
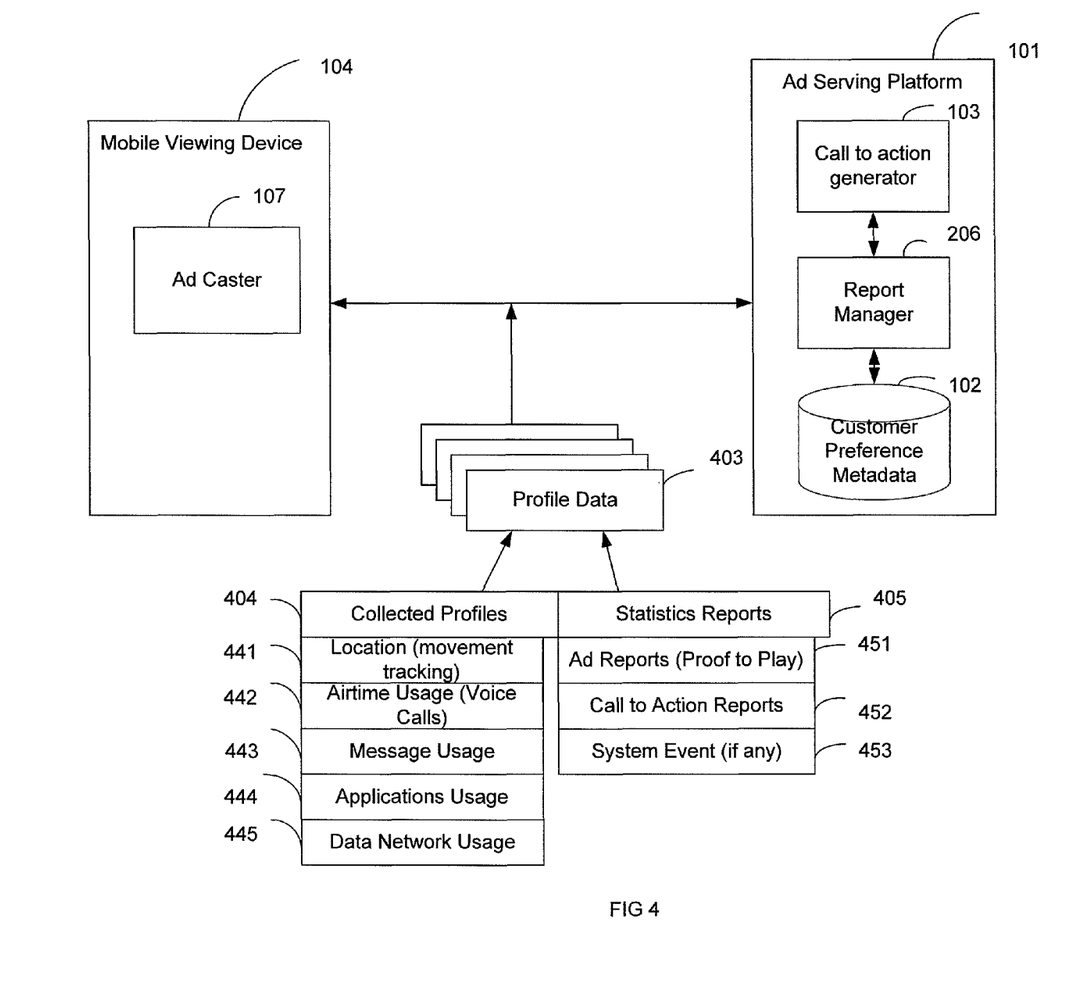
FIG. 4 is an illustration of a reporting and profiling system that collects metadata from a mobile viewer to be transferred to the ad server for updating user profiles according to one embodiment of the invention.

FIG. 4 shows collection and consolidation of data concerning user viewing, interacting, and responses to ads. This data can be used for maintaining and updating the customer preference metadata database 102. This data can also be used by the call to action generator 103 to generate the group/user specific mechanisms for user engagement to advertisements. In one embodiment, the ad caster 107 collects the user engagement data in real time. These are sent to the advertisement serving platform 101 where the information is used to update the existing user profile 404.

User profiles 404 typically include data collected from responses to ads, e.g. the location details 441 collected from movement, calls made 442, messaging usage 443, use of other applications 444, data network usage 445, etc. The statistics reports 405 include ad response reports 451, which, in turn provide proof-of-play for the video and ad. A call to action response report 452 contains information about when the call to action was activated, etc. A system event 453 report contains information on any system events, e.g., turn off of the display terminal, etc., to enable the advertiser to analyze the total end-to-end response of the user to the advertisement.

Together, the collected user profiles 404 and statistics data 405 form the profile data of the end-to-end response as shown in 403. The data thus collected is sent to the advertisement flow report manager 206 to process and update the stored user preference metadata 102. This information is used by the call to action generator 103 of the advertisement serving platform 101 to optimize the dynamic content added to the advertisements. It is also used by the advertiser to develop optimized advertising methodologies for improved acceptance of the message included in the advertisement.

In one embodiment, the ad serving platform selects an advertisement from a group of advertisements for transmission to a mobile device based on the recorded user responses to previously viewed advertisements.

Figure 5:
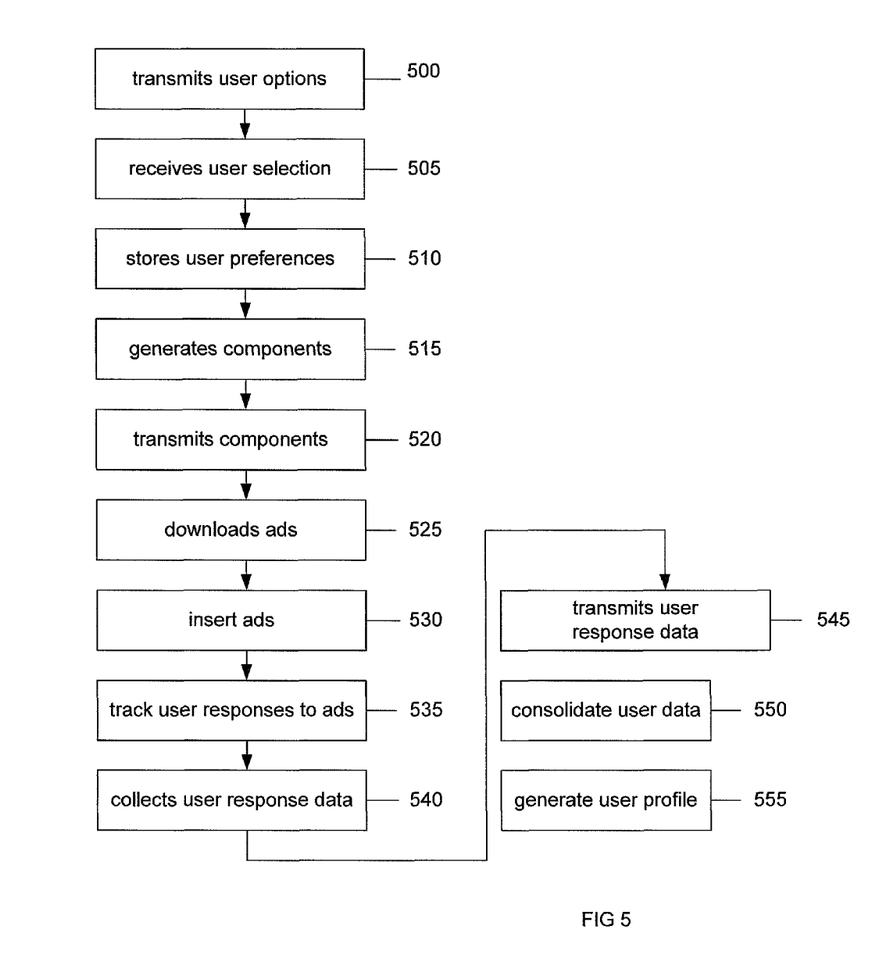
FIG. 5 is a flow diagram that illustrates the steps for distributing a targeted advertisement to a user and recording the response according to one embodiment of the invention.

FIG. 5 is a flow diagram that illustrates the steps for establishing a user interface for responding to an advertisement, insertion of advertisements into a content stream, recording the user response to the ad, and using the data to compile user profiles according to one embodiment of the invention. The ad serving platform 101 transmits 500 a list of user preferences to a user device for the user to select a preferred format.

The ad serving platform 101 receives 505 the user preference and stores 510 the user preference in the customer preference metadata database 102. The call-to-action framework 202 generates 515 components for enabling the selected user response. The ad serving platform 101 transmits 520 the components to the appropriate mobile viewer 104.

The mobile viewer 104 downloads 525 the advertisement before it receives the content stream. The micro-splicer inserts 530 the ads into the content stream. The call to action handler 305 tracks 535 the user responses to the ads. The ad caster 107 collects 540 the user response data and transmits 545 the user response data to the ad serving platform 101. The ad serving platform 101 consolidates 550 the user data and generates 555 user profiles.

The subject matter disclosed hereinabove may be embodied in a software and hardware implementation designed to execute on a specific hardware platform, firmware, hardware or any combination thereof.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A system for generating, downloading, and displaying interactive advertisements on a plurality of mobile viewing devices;
   wherein said interactive advertisements are comprised of both static and dynamic content;
   wherein each user of a plurality of users views content on an associated mobile viewing device of the plurality of mobile viewing devices, said system comprising:
   an ad serving platform implemented as a hardware computing server comprising:
      a call to action generator for assigning a call to action framework to said each user, said call to action framework configured for assembling for each mobile viewing device associated with said each user a plurality of interactive advertisements, each interactive advertisement of said interactive advertisements comprising a plurality of elements;
      wherein said each interactive advertisement is constructed from at least a first element, a second element, and a third element of the plurality of elements;
      wherein the first element comprises static advertisement content;
      wherein the second element comprises a first dynamic advertisement content based at least on the location of said each mobile viewing device when said each interactive advertisement is displayed;
      wherein the third element comprises a second dynamic advertisement content comprising at least one of a plurality of response modes for responding to said each interactive advertisement, wherein the at least one response mode included in the second dynamic advertisement content is selected from the plurality of response modes based on preference data stored for said each user; said call to action framework further configured for:
         extracting program identification information from said interactive advertisements into ad metadata, said ad metadata comprising instructions for selecting a particular interactive advertisement from said plurality of interactive advertisements; and downloading the ad metadata and uniquely inserting said particular interactive advertisement at a correct advertisement spot in a content flow for said each user upon receipt thereof at said each user's associated mobile viewing device;

a report manager for receiving a response from said each user to said interactive advertisements and for incorporating a user response into corresponding user profiles for use in generation of interactive advertisements by said call to action generator for said each user's associated mobile viewing device; and a customer preference metadata database for storing said user profiles on a computer readable medium.

2. The system of claim 1, wherein said dynamic content of said each interactive advertisement generated using said call to action framework comprises one from a group consisting of a click-to-call, click-to-browse, click-to-jump, click-to-message, click-to-mail, click-to-bookmark, click-to-share, and click-to-download.

3. The system of claim 1, wherein said ad serving platform receives said responses from said plurality of users to said particular interactive advertisement from at least one of a mobile viewing device, a mobile operator connected source, and a non-mobile operator connected source.

4. The system of claim 1, wherein said user profile comprises data including at least one of an airtime usage, a message usage, an application usage, a data network usage, a proof-to-play, a call to action, and a system event.

5. The system of claim 4, wherein said profile data is used to generate interactive advertisements for said each user.

6. A computer-implemented method for generating, downloading, and displaying interactive advertisements on a plurality of mobile viewing devices;

wherein said interactive advertisements are comprised of both static and dynamic content;

wherein each user, of a plurality of users, views content on an associated mobile viewing device of the plurality of mobile viewing devices, the method comprising the steps of:

collecting a user-preference list of a plurality of formats for displaying a user interface on a mobile viewing device for receiving a user response to an interactive advertisement;

responsive to a user selecting a format from said plurality of formats for displaying said preferred user interface, storing said format in a computer-readable storage medium as part of a user profile;

using a call to action framework, assembling for each mobile viewing device associated with said each user a plurality of interactive advertisements, each interactive advertisement of said interactive advertisements comprising a plurality of elements;

wherein said each interactive advertisement is constructed from at least a first element, a second element, and a third element of the plurality of elements;

wherein the first element comprises static advertisement content;

wherein the second element comprises a first dynamic advertisement content based at least on the location of the mobile viewing device when said interactive advertisement is displayed;

wherein the third element comprises a second dynamic advertisement content comprising at least one of a plurality of response modes for responding to said interactive advertisement, wherein the at least one response mode included in the second dynamic advertisement content is selected from the plurality of response modes based on preference data for said each user;

said call to action framework further configured for extracting program identification information from said interactive advertisements into ad metadata, said ad metadata comprising instructions for selecting a particular interactive advertisement from said plurality of interactive advertisements, downloading the ad metadata and uniquely inserting said particular interactive advertisement at a correct advertisement spot in a content flow for said each user upon receipt thereof at said each user's associated mobile viewing device;

receiving a response from said each user to said particular interactive advertisement from the mobile viewing device; and updating said each user's user profile with said response to said interactive advertisement.

7. The computer-implemented method of claim 6 further comprising the step of:

generating a user profile with data including at least one of:
an airtime usage,
a message usage,
an application usage, or
a data network usage.

8. The computer-implemented method of claim 6 further comprising the step of:

generating a statistic report with information comprising at least one of:
an ad report,
a call to action report, or
a system event.

9. The computer-implemented method of claim 6 further comprising the step of:

responsive to failure to receive a user-selected format for displaying said user interface, assigning a default format for displaying said user interface.

10. The computer-implemented method of claim 6, further comprising the step of:

selecting an advertisement from a plurality of generated interactive advertisements that is most likely to result in a purchase of a product displayed in said advertisement based on said user response to previously viewed advertisements.

11. A computer-implemented method for inserting an interactive advertisement of a plurality of interactive advertisements into a content stream and recording a user response to said interactive-advertisement;

wherein a user views content on an associated mobile viewing device, the method comprising:

extracting program identification information from said plurality of interactive advertisements into ad metadata, said ad metadata comprising instructions for selecting a particular interactive advertisement from said plurality of interactive advertisements;

wherein the particular interactive advertisement comprises:
static advertisement content;
dynamic advertisement content based at least on the location of the mobile viewing device when said particular interactive advertisement is displayed; and
at least one of a plurality of response modes for responding to the particular interactive advertisement, the at least one response mode included based on preference data from the user;

retrieving from said particular interactive advertisement the at least one response mode for recording said user response to said particular interactive advertisement;

inserting said particular interactive advertisement into a correct advertisement spot in a content stream;

rendering said content stream and said particular interactive advertisement;

activating a user interface providing said response modes for recording the user response to said particular interactive advertisement;

tracking said user response to said particular interactive advertisement;

storing said user response on a computer readable storage medium on the mobile viewing device; and transmitting said user response from the mobile viewing device to an ad serving platform over a transmission channel when said transmission channel becomes available.

12. The computer-implemented method of claim 11, further comprising the steps of:

extracting from said particular interactive advertisement instructions for inserting said particular interactive advertisement into said content stream;

scanning said content stream for an addressable spot guide; and inserting said particular interactive advertisement into said addressable spot guide in said content stream.

13. The computer-implemented method of claim 12, further comprising the steps of:

redirecting said media player to render from an ad buffer instead of a content buffer for a period of an advertisement spot; and directing said media player to render from said content buffer once said particular interactive advertisement is rendered.

14. The computer-implemented method of claim 11, further comprising the steps of:

storing said user response in said computer-readable storage medium on the mobile viewing device when transmission channels to said ad serving platform are unavailable; and transmitting said user response to said ad serving platform when said transmission channels become available.

15. The computer-implemented method of claim 14, further comprising the step of:

removing said user response from said computer-readable storage medium in response to transmitting said user response to said ad serving platform.

16. The computer-implemented method of claim 11, wherein said response to said interactive advertisement consists of information selected from:

a location of said mobile device,
any call made by said mobile device,
a messaging usage,
an application use, and
a data network use.

17. The computer-implemented method of claim 11, further comprising the step of:

recording all ad-related activities.

18. A system for downloading and displaying an interactive advertisement of a plurality of interactive advertisements viewed by a user on an associated mobile viewing device, and for collecting individual responses thereto, the system comprising:

a call to action framework, configured for generating said plurality of interactive advertisements;

wherein an interactive advertisement of said interactive advertisements comprises content that includes:

static advertisement content;

dynamic advertisement content based at least on the location of the mobile viewing device when said interactive advertisement is displayed; and at least one of a plurality of response modes for responding to said interactive advertisement, wherein the at least one response mode is selected based on preference data for said user;

an ad caster;
a micro-splicer; and
a media player;

said ad caster comprising:

a download and housekeeping manager to download said ad metadata of said interactive advertisement and collect user responses for storage and logging; and a report logger to log and store said user responses; and a transport manger to handle data transport to and from the mobile viewing device;

said media player comprising:

a content buffer for loading and rendering said content and also said interactive advertisement for display on the mobile viewing device;

an ad buffer for storing said interactive advertisement;

a metadata detection module for extracting metadata from said interactive advertisement to determine where to insert said interactive advertisement in a content stream, wherein said metadata comprises program identification information, and said metadata detection module also for transmitting instructions for transferring said interactive advertisement to said content buffer from said ad buffer;

said micro-splicer for inserting said interactive advertisement into said content stream redirecting said media player to render from a first location in said content buffer, storing and rendering said content stream, to a second location in said content buffer for storing and rendering said interactive advertisement, for a duration of an ad spot chosen for display of said interactive advertisement and then switching back to rendering from said first location in said content buffer; and said micro-splicer further for collecting and transferring said user responses to said interactive advertisement to said report logger for storage and transmission.

* * * * *